(12) United States Patent
Hornung et al.

(10) Patent No.: US 10,618,808 B2
(45) Date of Patent: Apr. 14, 2020

(54) CATALYST SUPPORT, RECYCLE REACTOR AND METHOD FOR RELEASING HYDROGEN

(71) Applicant: Fraunhofer-Gesellschaft zur Förderung der angewandten Forschung e.V., Munich (DE)

(72) Inventors: Andreas Hornung, Karlsruhe (DE); Samir Binder, Illschwang (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 15/621,734

(22) Filed: Jun. 13, 2017

(65) Prior Publication Data

US 2017/0283258 A1 Oct. 5, 2017

Related U.S. Application Data

(63) Continuation of application No. PCT/EP2015/079622, filed on Dec. 14, 2015.

(30) Foreign Application Priority Data

Dec. 17, 2014 (DE) .......................... 10 2014 226 282

(51) Int. Cl.
*C01B 3/28* (2006.01)
*B01J 23/42* (2006.01)
(Continued)

(52) U.S. Cl.
CPC .................. *C01B 3/28* (2013.01); *B01J 8/12* (2013.01); *B01J 8/20* (2013.01); *B01J 8/382* (2013.01);
(Continued)

(58) Field of Classification Search
CPC ...... B01J 2208/00132; B01J 2208/0015; B01J 2208/00389; B01J 2208/00415;
(Continued)

(56) References Cited

U.S. PATENT DOCUMENTS

| 5,958,273 A | 9/1999 | Koch et al. |
| 2006/0045828 A1* | 3/2006 | Aaron .................... B01J 8/0496 422/629 |

(Continued)

FOREIGN PATENT DOCUMENTS

| CN | 102166532 A | 8/2011 |
| CN | 102925245 A | 2/2013 |

(Continued)

OTHER PUBLICATIONS

Andreas Hornung, "Entwicklung eines Verfahrens zur fraktionierten thermischen Zersetzung von Kunststoffgemischen" (with translation), Fotschrittberiche VDI, dated Jan. 28, 1997, pp. 19-29, Series 3: Process Engineering, No. 484, Kaiserslautern, Germany.
(Continued)

*Primary Examiner* — Amber R Orlando
*Assistant Examiner* — Syed T Iqbal
(74) *Attorney, Agent, or Firm* — Brinks Gilson & Lione (57) ABSTRACT

A catalyst support may be provided that comprises: an inner core, which includes at least one phase change material; a coating layer around the inner core, which includes at least one metal oxide; a catalytically active layer, which is positioned in interstices of the coating layer and/or lying on the coating layer, wherein at least one catalytically active substance is included in the catalytically active layer; and a supporting layer which is positioned under the coating layer. A recycle reactor may be provided comprising a reservoir for accommodating a chemical hydrogen storage substance; the catalyst support; a screw conveyor for input and trans- (Continued)

port of the catalyst support; and a heating device with which the catalyst support can be heated. A method for releasing hydrogen from a chemical hydrogen storage substance may be provided.

19 Claims, 3 Drawing Sheets

(51) Int. Cl.
| | |
|---|---|
| *B01J 35/08* | (2006.01) |
| *B01J 37/02* | (2006.01) |
| *B01J 35/00* | (2006.01) |
| *B01J 35/02* | (2006.01) |
| *B01J 8/38* | (2006.01) |
| *F28D 20/02* | (2006.01) |
| *B01J 8/20* | (2006.01) |
| *B01J 35/12* | (2006.01) |
| *B01J 23/44* | (2006.01) |
| *C01B 3/26* | (2006.01) |
| *B01J 8/12* | (2006.01) |
| *B01J 37/00* | (2006.01) |
| *C01B 3/22* | (2006.01) |
| *C09K 5/06* | (2006.01) |
| *B01J 37/34* | (2006.01) |

(52) U.S. Cl.
CPC ............... *B01J 8/386* (2013.01); *B01J 23/42* (2013.01); *B01J 23/44* (2013.01); *B01J 35/002* (2013.01); *B01J 35/008* (2013.01); *B01J 35/0033* (2013.01); *B01J 35/023* (2013.01); *B01J 35/08* (2013.01); *B01J 35/12* (2013.01); *B01J 37/0081* (2013.01); *B01J 37/023* (2013.01); *B01J 37/0225* (2013.01); *B01J 37/0242* (2013.01); *C01B 3/22* (2013.01); *C01B 3/26* (2013.01); *F28D 20/023* (2013.01); *B01J 35/026* (2013.01); *B01J 37/34* (2013.01); *B01J 2208/0015* (2013.01); *B01J 2208/00132* (2013.01); *B01J 2208/00389* (2013.01); *B01J 2208/00415* (2013.01); *C01B 2203/0277* (2013.01); *C01B 2203/085* (2013.01); *C01B 2203/107* (2013.01); *C01B 2203/1082* (2013.01); *C01B 2203/1211* (2013.01); *C01B 2203/1252* (2013.01); *C09K 5/063* (2013.01); *Y02E 60/145* (2013.01); *Y02E 70/30* (2013.01); *Y02P 20/584* (2015.11)

(58) Field of Classification Search
CPC . B01J 23/42; B01J 23/44; B01J 35/002; B01J 35/0033; B01J 35/008; B01J 35/023; B01J 35/026; B01J 35/08; B01J 35/12; B01J 37/0081; B01J 37/0225; B01J 37/023; B01J 37/0242; B01J 37/34; B01J 8/12; B01J 8/20; B01J 8/382; B01J 8/386; C01B 2203/0277; C01B 2203/085; C01B 2203/107; C01B 2203/1082; C01B 2203/1211; C01B 2203/1252; C01B 3/22; C01B 3/26; C01B 3/28; C09K 5/063; F28D 20/023; Y02E 60/145; Y02E 70/30; Y02P 20/584
See application file for complete search history.

(56) References Cited

U.S. PATENT DOCUMENTS

| | | | |
|---|---|---|---|
| 2009/0260287 A1* | 10/2009 | Lau | ............................ C01B 3/38 48/127.7 |
| 2014/0197355 A1 | 7/2014 | Ram et al. | |
| 2015/0190796 A1* | 7/2015 | Bedel | .................. B01J 37/0238 518/715 |

FOREIGN PATENT DOCUMENTS

| | | |
|---|---|---|
| CN | 103084215 | 5/2013 |
| CN | 103406156 A | 11/2013 |
| DE | 19620721 A1 | 11/1996 |
| DE | 10029422 A1 | 12/2001 |
| DE | 10 2008 034 221 A1 | 1/2010 |
| DE | 10 2010 004 358 A1 | 6/2011 |
| DE | 10 2010 025 297 A1 | 12/2011 |
| DE | 10 2011 079 858 A1 | 1/2013 |
| DE | 10 2012 004 444 A1 | 9/2013 |
| DE | 10 2012 221 809 A1 | 5/2014 |
| DE | 10 2012 222 560 A1 | 6/2014 |
| DE | 10 2013 203 892 A1 | 9/2014 |
| WO | WO 2011/088132 A1 | 7/2011 |
| WO | WO 2014/013440 A2 | 1/2014 |
| WO | WO 2014/086551 A1 | 6/2014 |

OTHER PUBLICATIONS

Andreas Hornung et al., "Ein Kugelkreislaufreaktor zur Umsetzung viskoser Medien" (with translation), Chemie Ingenieur Technik, dated 1998, pp. 264-267, vol. 3, No. 98, Wiley-VCH Verlag GmbH, Weinheim, Germany.

Werner Schatt et al., "Pulvermetallurgie—Technologien and Werkstoffe" (with translation), dated 2007, pp. 392-393, Springer International Publishing Ltd., Berlin, Germany.

Jennifer Carrasco Portaspana, "High temperature thermal energy storage systems based on latent and thermos-chemical heat storage," dated Jul. 2011, pp. 1-81, Vienna.

Wolf-Dieter Steinmann et al., "Latent Heat Storage for Solar Steam Systems," Journal of Solar Energy Engineering, dated Feb. 2008, pp. 011004-1-011004-5, vol. 130, The American Society of Mechanical Engineers, Stuttgart, Germany.

Norman Reger, "Hochtemperatur-PCM warden schüttbar", Energiespeicher, dated Oct. 7, 2014, pp. 1-2, Fraunhofer IFAM Dresden, Dresden, Germany.

Sobota et al., "Dehydrogenation of Dodecahydro-Nethylcarbazole on Pd/Al2O3 Model Catalysts," dated Aug. 2011, pp. 11542-11552, Chemistry a European Journal, Wiley-VCH Verlag GmbH & Co. KGaA, Weinheim, Germany.

Brückner et al., "Evaluation of Industrially Applied Heat-Transfer Fluids as Liquid Organic Hydrogen Carrier Systems," dated 2014, pp. 229-235, ChemSusChem, Wiley-VCH Verlag GmbH & Co. KGaA, Weinheim, Germany.

Yang et al., "Hydrogenation of N-propylcarbazole Over Supported Ruthenium as a New Prototype of Liquid Organic Hydrogen Carriers (LOHC)," dated Oct. 2013, pp. 24877-24881, The Royal Society of Chemistry.

Teichmann et al., "A Future Energy Supply Based on Liquid Organic Hydrogen Carriers," dated Jul. 2011, pp. 2767-2773, The Royal Society of Chemistry.

Pendyala, "Macroencapsulation of Phase Change Materials for Thermal Energy Storage," dated Jan. 2012, pp. 1-96, University of South Florida, Scholar Commons.

* cited by examiner

CATALYST SUPPORT, RECYCLE REACTOR AND METHOD FOR RELEASING HYDROGEN

CROSS-REFERENCE TO RELATED APPLICATIONS

This application is a continuation of international patent application PCT/EP2015/079622 filed Dec. 14, 2015, the entire contents of which are incorporated by reference, which claims priority under 35 USC § 119 to German patent application 10 2014 226 282.8 filed Dec. 17, 2014.

TECHNICAL FIELD

The invention relates to a catalyst support with an inner core, which contains at least one phase change material or consists thereof, a coating layer around the inner core, which contains at least one metal oxide and a catalytically active layer, which is positioned in the interstices of the coating layer and/or lying on the coating layer, wherein at least one catalytically active substance is contained in the catalytically active layer. Furthermore, the invention relates to a recycle reactor with at least one such catalyst support and a method for releasing hydrogen from a chemical hydrogen storage substance.

BACKGROUND

As an alternative to fossil fuel, hydrogen is being trialed, wherein a major challenge consists in the storage and release of the hydrogen. A very promising approach is the use of regenerable, liquid hydrogen carrier materials (Sobota, M., Nikiforidis, I., Amende, M., Zanón, B. S., Staudt, T., Höfert, O., Lykhach, Y., Papp, C., Hieringer, W., Laurin, M., Assenbaum, D., Wasserscheid, P., Steinrück, H.-P., Görling, A. and Libuda, J. (2011), Dehydrogenation of Dodecahydro-N-ethylcarbazole on Pd/Al$_2$O$_3$ Model Catalysts. Chem. Eur. J., 17:11542-11552. doi: 10.1002/chem.201101311). Liquid hydrogen carrier materials are also described in DE 10 2008 035 221 A1 and EP 1 475 349 A2. For the storage of hydrogen in liquid hydrogen carrier materials, a chemical substance is needed which can assume a reversible energy-rich and energy-poor state. This occurs through catalytic hydrogenation and dehydrogenation of the substance. A substance which can advantageously be used for these reactions can thus serve as a hydrogen storage substance (Teichmann, D., Arit, W., Wasserscheid, P., Freymann, R.: A future energy supply based on Liquid Organic Hydrogen Carriers (LOHC); Energy and Environmental Science, Issue 8, 2011).

LOHC systems known in the prior art are as a rule pairs of substances in which the energy-poor substance A is a high-boiling, functionalized aromatic compound, which is hydrogenated in the energetic loading process. One example relates to the use of the substance pair N-ethylcarbazole/perhydro-N-ethylcarbazole, with which the energy loading can typically be performed at about 140° C. and elevated pressures and the energy unloading at temperatures between 230 and 250° C.

In said systems, the energy-rich substance perhydro-N-ethylcarbazole has a hydrogen capacity of about 6 mass % hydrogen. Thus the energy in the releasable hydrogen from 100 kg of perhydro-N-ethylcarbazole suffices to move a motor vehicle about 500 km, during which in the energy utilization on board water vapor is almost exclusively formed as the combustion product. Thus the approach presents a technically interesting alternative to other energy storage concepts for mobile applications.

A class which is also interesting for this application is represented by heat transfer oils, such as for example dibenzyltoluene, which can be catalytically hydrogenated at temperatures over 260° C. Such substances are known from Brückner, N., Obesser, K., Bösmann, A., Teichmann, D., Arlt, W., Dungs, J. and Wasserscheid, P. (2014). Evaluation of Industrially Applied Heat-Transfer Fluids as Liquid Organic Hydrogen Carrier Systems. ChemSusChem, 7: 229-235. doi: 10.1002/cssc.201300426.

DETAILED DESCRIPTION

The dehydrogenation of liquid hydrogen carrier materials is effected catalytically at temperatures of over 260° C. The hydrogen thereby released can for example be energetically utilized in a fuel cell or in a combustion engine. If the hydrogen release is effected on board a vehicle, the hydrogen thereby provided can be used directly for operating the vehicle. A problem in the catalytic dehydrogenation of the liquid hydrogen carrier materials is energy-efficient and uniform heating of the catalysts, and the contacting of the catalysts with the reactants at a temperature optimal for the conversion.

In reaction systems for the dehydrogenation of such hydrogen carriers, the efficient introduction of heat into the reactor causes problems since the heat must be transported to the reaction site over relatively long distances by poorly heat-conducting media. Furthermore, care must be taken in the temperature management that no hot spots form on the surface of the catalyst, which can result in the partial deactivation of the catalyst.

Said difficulties with the thermal coupling affect in particular the cold start behavior and the performance of the hydrogen release apparatus and prevent its use in mobile and dynamic applications such as for example for use in motor vehicles. Further, heating for the whole quantity of hydrogen carrier in a tank is as a rule necessary in order to ensure an optimal reaction temperature on the catalytically active areas. For this purpose, large quantities of energy must be used, which in the major part of the liquid which is not in the direct vicinity of the catalyst cannot contribute to an increase in the reaction rate and thus decrease the energy efficiency.

Therefore, starting from the existing prior art, it is the objective of the present invention to provide a reactor and a catalyst support as a constituent of the reactor for the release of hydrogen, which are characterized by improved energy management and better energy efficiency. Further, an advantageous method for the release of hydrogen from a chemical hydrogen storage substance should be provided.

In one embodiment, the invention relates to a catalyst support, comprising at least one inner core which contains at least one phase change material or consists thereof, a coating layer around the inner core, which contains at least one metal oxide or consists thereof, and a catalytically active layer, which is positioned in the interstices of the coating layer and/or lying on the coating layer, wherein in the catalytically active layer at least one catalytically active substance is contained, wherein the catalyst support further has a supporting layer which is positioned under the coating layer.

Here the supporting layer forms a mechanically stable shell or casing for the catalyst support, so that this is not damaged during transport through a recycle reactor. Furthermore, the supporting layer ensures that the phase change material remains enclosed in the catalyst support even when this is present in liquid or gaseous form.

The outermost layer is formed of a catalytically active substance which promotes the chemical reaction which leads to the dehydrogenation of the hydrogen carrier.

The coating layer lying between can be used to improve the adherence of the catalytically active layer, to passivate the surface of the supporting layer and/or to control the heat release of the phase change material on the surface of the catalyst support. In some embodiments of the invention, the coating layer can therefore contain an oxide which on the one hand prevents the oxidation of the supporting layer and on the other hand has low thermal conductivity, so that with increasing layer thickness the heat release is increasingly retarded.

In one embodiment of the invention, the phase change material contained in the inner core has a phase change temperature of less than about 500° C., or less than about 400° C. or less than about 350° C.

In a further embodiment of the invention, the inner core has an electrically conducting internal structure. This allows direct heating of the phase change material by means of an alternating electrical field which creates eddy currents in the interior of the electrically conducting internal structure.

In some embodiments of the invention, the electrically conducting inner structure can contain at least one sponge and/or a mesh and/or particles or consist thereof, which in each case are made of a metal or an alloy.

In some embodiments of the first aspect of this invention, the phase change material in the inner core contains an inorganic salt.

In one embodiment of the invention, the metal oxide contained in the coating layer is electrically insulating. This makes it possible to inductively heat an electrically conducting structure situated within the catalyst support or an electrically conducting support layer. In some embodiments of the invention, the coating layer is regarded as insulating when its electrical conductivity is less than $10^{-7}$ S·m$^{-1}$ or less than $10^{-8}$ S·m$^{-1}$ or less than $10^{-9}$ S·m$^{-1}$.

In one embodiment of the invention, a catalytically active substance contained in the catalytically active layer is a hydrogenation catalyst for a chemical hydrogen storage substance and/or a catalytically active substance contained in the catalytically active layer is a dehydrogenation catalyst for a chemical hydrogen storage substance.

In one embodiment of the invention, the catalyst support is cylindrical, dumbbell-shaped, egg-shaped or spherical.

In some embodiments of the invention, a spherical catalyst support has a diameter between about 1 cm and about 10 cm or between about 1.5 cm and about 8 cm or between about 2 cm and about 6 cm. This size is easily producible, easily transportable in the recycle reactor and has a sufficient thermal capacity.

In some embodiments of the invention, the supporting layer contains a steel alloy or consists thereof. This enables easy production, since a hollow sphere of steel can easily be closed by welding, after filling with the phase change material. Furthermore, steel has good thermal conductivity and can be inductively heated because of its electrical conductivity.

In some embodiments of the invention, the coating layer has a thickness of about 10 µm to about 5 mm or a thickness of about 20 µm to about 1 mm or a thickness of about 30 µm to about 100 µm or a thickness of about 30 µm to about 60 µm. Thereby, the heat release can be controlled within a wide range, so that the reaction proceeds at a desired rate and the occurrence of hot spots on the surface is avoided.

In some embodiments of the invention, the catalytically active layer is made as a partial coating. Thus the reaction rate can be controlled by the degree of covering or the quantity of catalytically active material. In some embodiments of the invention, the partial coating can cover between about 5% and about 25% of the surface of the catalyst support.

In some embodiments of the invention, the coating layer can contain aluminum oxide and/or silicon oxide and/or titanium oxide or consist thereof.

In some embodiments of the invention, the surface of the catalyst support may be calcined. The lifetime of the catalyst support may be prolonged thereby.

The invention further relates to a recycle reactor which contains at least one reservoir for accommodating a chemical hydrogen storage substance. Furthermore, the recycle reactor contains at least one catalyst support, which was described above and a screw conveyor for input and transport of the catalyst support and a heating device with which the at least one catalyst support can be heated. Through the introduction of heated catalyst support into the reservoir for accommodating the chemical hydrogen storage substance, the dehydrogenation reaction takes place immediately on the hot surface of the catalyst support, without the entire contents of the reservoir having to be heated. After the removal of the catalyst support, the dehydrogenation stops, so that the release of gaseous oxygen can be very rapidly controlled or regulated. Through the phase change material contained in the catalyst supports and the latent heat stored therein, rapid cooling and hence a premature end to the reaction are avoided.

In one embodiment of the invention, the heating device can comprise an induction heating system. Here the contactless induction heating is energetically advantageous and easy to regulate.

The invention further relates to a method for releasing hydrogen from a chemical hydrogen storage substance, comprising at least the heating of catalyst supports as described above, the addition of the catalyst support to a chemical hydrogen storage substance and the catalytic dehydrogenation of the hydrogen storage substance. Through the introduction of heated catalyst supports into the reservoir for accommodating the chemical hydrogen storage substance, the dehydrogenation reaction takes place immediately on the hot surface of the catalyst support, without the entire contents of the reservoir having to be heated. Hence the method is energetically advantageous and exhibits only slight control delays with changing hydrogen demand, for example for motor applications. In some embodiments of the invention, the at least one catalyst support can be transported between heating device and hydrogen storage substance by at least one screw conveyor. As a continuous conveyor, such a screw conveyor can enable the continuous transport of the catalyst support and hence continuous hydrogen release.

In some embodiments of the invention, the hydrogen storage substance can contain perhydro-N-ethylcarbazole or dibenzyltoluene or consist thereof.

DESCRIPTION OF THE INVENTION

Described below inter alia is a reactor which on the industrial scale enables the dehydrogenation of hydrogen very energy-efficiently. The basis is a ball recycle reactor (BRR), which is already used in other applications.

The ball recycle reactor is a system which was previously developed in another context for the fractionated thermal decomposition of plastic mixtures (described inter alia in Hornung, A.: Entwicklung eines Verfahrens zur fraktionierten thermischen Zersetzung von Kunstoffgemischen [Development of a method for the fractionated thermal decomposition of plastic mixtures], Dissertation, Kaiserslautern, and in the German patent application DE 19620721).

Through the built-in screw conveyor, in this reactor balls and the surrounding viscous medium are conveyed in the circuit. As a result, chemical reactions can proceed in thin films on the ball surface. The balls are conveyed in a heating zone. The energy required is provided by means of electrical wall, bottom, internal pipe heating and gas heaters. Use of such a reactor for performing heat-sensitive reactions is unknown from the prior art.

Compared to the known prior art, it was surprisingly now found that a certain type of catalyst supports as a component of such a recycle reactor considerably improves the energy efficiency and the heat management of heat-sensitive reactions and above all of catalytic dehydrogenation reactions of chemical hydrogen storage substances.

The catalyst supports according to the invention comprise at least one inner core which contains at least one phase change material, a coating layer around the inner core, which contains at least one metal oxide, and a catalytically active layer, which is provided either in the interstices of the coating layer or lying on the coating layer, wherein at least one catalytically active substance is contained in the catalytically active layer.

The catalyst supports according to the present invention have the advantage that their inner core, which contains at least one phase change material, is very well suited for heat storage and can release this outwards onto the surfaces of the catalyst support in a very controlled manner. Thus overheating of the surface of the catalyst support, the formation of hot spots and the inactivation of the catalyst on the surface associated therewith can be avoided. Depending on the temperature difference, various PCM materials offer marked advantages compared to the prior art (see FIG. 3). The results shown in FIG. 3 were obtained with balls of diameter 3.7 cm. However, the results can also be applied to balls with other diameters.

The catalyst supports of the present invention can have any conceivable shape. Preferably, the catalyst supports have a shape which is suitable for conveying within the recycle reactor according to the invention. In one embodiment of the present invention, catalyst supports are cylindrical, dumbbell-shaped, egg-shaped or spherical.

In a further embodiment of the present invention, the phase change material in the inner core has a phase change temperature which lies in a low range, for example at most about 550° C., or at most about 500° C., or at most about 400° C., or at most about 350° C., or at most about 300° C., or at most about 250° C.

In one embodiment of the present invention, the phase change material in the inner core has a phase change temperature of at least about 150° C., or at least about 200° C., further or at least about 250° C., or at least about 300° C.

In one embodiment of the present invention, the phase change material in the inner core has a phase change temperature of between about 200° C. and about 250° C.

With a phase change material which has such a phase change temperature, a heat release which ensures an optimal reaction temperature on the surface for the catalyst can be guaranteed. In this manner, heat release takes place only on the surface of the catalyst support, as a result of which an optimal environment for the progression of the catalyzed reaction is ensured on this surface. Furthermore, excessive heating of the liquid reactant which is not located in the vicinity of the catalyst support is avoided.

The phase change material can of course be selected depending on the optimal reaction temperature and catalyst used in terms of a phase change temperature matching this. Here phase change materials with melting temperatures $T_m$ and freezing temperatures $T_f$ in the required temperature range are most suitable.

In one embodiment of the present invention, the phase change material is an inorganic salt or a combination of several inorganic salts. Possible salts or combinations of salts for use as phase change material in the sense of the present invention are $LiNO_3$ ($T_m$=254° C.), $NaNO_2$ ($T_m$=282° C.), $NaNO_3$+$NaCl$ ($T_m$=282° C.), $KNO_3$+$NaNO_3$ ($T_m$=290° C.), $NaNO_3$ ($T_m$=310° C.), $NaOH$ ($T_m$=318° C.), $KNO_3$ ($T_m$=337° C.) and $MgCl_2$+$NaCl$+$KCl$ ($T_m$=385° C.)

In another embodiment, metallic phase change materials are used, wherein eutectic systems with melting temperatures $T_m$ and freezing temperatures $T_f$ in the required range are most suitable. Possible systems are Cu—Mg—Sn (eutectic, steel-compatible, $T_m$=462° C., $T_f$=459° C.) and Al—Mg—Bi (eutectic, not steel-compatible, $T_m$=522° C., $T_f$=521° C.). In one embodiment, the phase change material is an alloy of Cu—Mg—Sn.

In some embodiments of the invention, metals or alloys can be used as the phase change material. These phase change materials have an improved temperature holding capacity and a higher heat storage capacity compared to solid steel balls (see FIG. 3).

In another embodiment, the inner core contains a metal alloy, another electrically conducting material or a metallic conducting inner structure. In a further embodiment, the metal alloy, another electrically conducting material or a metallic conducting inner structure is an inductively heatable material.

With heating by induction, energy in the form of an alternating electromagnetic field is transferred to the inductively heatable material and there converted into heat. The alternating electromagnetic field induces eddy currents in a metallic material located in the vicinity, which heat the metallic material through the ohmic resistance. The usual frequency here lies in the range from about 20 to 50 kHz.

In a further embodiment, the metal alloy, the other electrically conducting material or the metallic conducting inner structure is an alloy based on iron, nickel, cobalt or manganese, and further electrically conducting alloys which exhibit a coupling behavior on inductive heating.

In a further embodiment, a metal sponge or a metal mesh is provided in the inner core of the catalyst support. In another embodiment, a metal or conducting material can also be distributed in the form of a powder in the phase change material. This metal or conducting material can be heated contactless by induction and release the heat to the phase change material. A suitable phase change material in the sense of the invention can then release the absorbed heat outwards appropriately under the parameters desired for the reaction.

According to the present invention, the catalyst supports further comprise a coating layer around the inner core, which contains at least one metal oxide. Such a coating layer is additionally provided around the core in order to be able to regulate and control the heat release onto the surface depending on the requirements of the use of the catalyst supports. The present invention also comprises the use of a metal oxide component as part of the coating layer of a catalyst support, the catalyst support comprising at least one inner core, which contains at least one phase change material, a coating layer around the inner core, and a catalytically active layer which is provided either in the interstices of the coating layer or lying on the coating layer, wherein at least one catalytically active substance is contained in the catalytically active layer, for regulating the release of the heat generated in the inner core of this catalyst support on the surface of the catalytically active layer.

Thus according to the present invention even with major heat evolution in the inner core of the catalyst support it is possible to control the heat release onto the surface through a coating layer around the inner core which contains a metal oxide. In one embodiment of the present invention, the metal oxide which is provided in the coating layer around the inner core is not electrically conducting. In a further embodiment of the present invention, the metal oxide which is provided in the coating layer around the inner core is not inductively heatable.

Depending on the demands on the catalytic reaction and depending on the choice of the materials of the inner core, those skilled in the art on the basis are able of their specialist knowledge to select a suitable material such as for example a metal oxide for the coating layer and to choose a suitable thickness for this coating layer in order to obtain the desired release of the heat onto the surface of the catalyst support.

In one embodiment, the coating layer is an oxide ceramic layer, for example with contents of chromium oxide, titanium oxide, calcium oxide, silicon oxide, iron oxide, zirconium oxide, aluminum oxide, silicon carbide, tungsten carbide.

In a further embodiment, the thickness of the coating layer around the inner core is between about 10 μm and about 5 mm, or between about 20 μm and about 100 μm or between about 40 μm and about 60 μm, or about 50 μm.

In a further embodiment, a supporting layer can be provided between the coating layer and the inner core of the catalyst support. In some embodiments of the invention, such a supporting shell consists of steel or another electrically conducting material, for example a metal or an alloy.

According to the present invention, the catalyst supports further comprise a catalytically active layer which is provided either in the interstices of the coating layer or lying on the coating layer, wherein a catalytically active substance is provided in the catalytically active layer.

In one embodiment of the present invention, the coating can be made from metal oxide by thermal spraying, by slip casting or from powder slurry. Next, the catalytically active layer can be applied by impregnation, sol-gel methods or ion exchange.

In one embodiment of the present invention, the catalytically active layer is provided in interstices of the coating layer. In a further embodiment, the catalytically active layer is an integral component of the coating layer or the at least one catalytically active substance is distributed in the coating layer.

In a further embodiment of the present invention, the coating layer has a solid, rough structure. In some embodiments, the coating layer can have a rough surface with an average roughness depth $R_z$ between about 5 μm and about 200 μm, or between about 10 μm and about 100 μm, or between 20 and 30 μm. The roughness depth $R_z$ in the sense of this invention is determined according to DIN EN ISO 4768.

Such a reaction system has considerable advantages for hydrogen release from liquid compounds. The response capability of the reactor is very high and at the same time owing to the roughness of the material surface very easy detachment of the gas formed from the catalyst surface takes place. In addition, the reaction system according to this embodiment shows marked advantages compared to the prior art with regard to pressure drop and thermal coupling.

In one embodiment, the catalytically active layer is provided lying on the coating layer. This means that the coating layer and the catalytically active layer are two discrete layers. In one embodiment of the present invention, the catalytically active layer can be provided lying directly on the coating layer, alternatively one or more intermediate layers can be present between the coating layer and the catalytically active layer.

In one embodiment of the invention, the catalytically active substance is understood to be a substance which increases the reaction rate by lowering the activation energy of a chemical reaction, without itself being consumed thereby. The catalytically active substance can be selected depending on the use field of the catalyst supports. In one embodiment of the present invention, a catalytically active substance contained in the catalytically active layer is a hydrogenation catalyst for a chemical hydrogen storage substance.

As hydrogenation catalysts in the sense of the present invention, platinum noble metals such as palladium, platinum, rhodium, ruthenium or Raney nickel can be used. In some embodiments of the invention, ruthenium-containing catalysts can be used as the hydrogenation catalyst. As support materials for the catalysts, metal oxides such as for example $Al_2O_3$, $SiO_2$ or $TiO_2$ or activated carbon can be used.

As the precursor for the impregnation of the coating layer with a hydrogenation catalyst, ruthenium(III) chloride or ruthenium(IV) oxide can be used. The catalyst must be calcined after the impregnation. Metal concentrations up to 5 wt. % can be used for the hydrogenation of the hydrogen carrier.

In one embodiment of the present invention, a catalytically active substance contained in the catalytically active layer is a dehydrogenation catalyst for a chemical hydrogen storage substance.

As dehydrogenation catalysts in the sense of the present invention, platinum noble metals on supports are used, mostly metal oxides. The dehydrogenation catalyst can be selected from ruthenium, rhodium, palladium and/or platinum as the catalytically active component.

The activity of the noble metals with regard to the dehydrogenation increases in the order Rh<Ru<Pt<Pd.

The catalytically active noble metals can be applied onto the metal oxides by wet impregnation and subsequent calcining. As the precursor for the impregnation, metal salts can be used, e.g. $PdCl_2$. In some embodiments of the invention, metal concentrations of less than 5 wt. % can be used for the dehydrogenation of the hydrogen carrier. As support materials, $SiO_2$ or $Al_2O_3$ are suitable.

In one embodiment of the present invention, the chemical hydrogen storage substance is based on N-ethylcarbazole, and in another embodiment of the present invention, the chemical hydrogen storage substance is based on dibenzyltoluene.

The catalyst supports according to the invention according to one embodiment can be produced as follows. The catalyst support contains at least one phase change material, which is imbedded in a hollow body. The phase change material constitutes a latent heat storage substance which absorbs or releases heat at constant temperature. The hollow body is coated with a catalytically active material. The PCM material, for example an alloy of Cu—Mg—Sn, is poured into a shell layer consisting of two hemispheres of steel. The two hemispheres are then welded together (concerning this see also W.-D. Steinmann: Latent Heat Storage for Solar Steam Systems, Journal of Solar Energy Engineering 130, 2008 and J. C. Portaspana: High temperature thermal energy storage systems based on latent and thermo-chemical heat storage, Master Thesis, Technische Universitat Wien, Fakultät für Maschinenwesen and Betriebswissenschaften [Vienna University of Technology, Faculty of Mechanical and Industrial Engineering, 2001]).

The welding of the balls can be performed by welding under vacuum, or by electron beam welding. In this manner, the encapsulation of the phase change material is effected such that a hollow space remains in the filled ball, which enables a certain pressure buildup in order to compensate for shrinkage and expansion of the phase change material filling.

As the supporting shell of the catalyst support, steel balls can be used, which can for example be produced via sheet forming (pressing, forging, etc.) or by coating of styropore balls with powder slurry and subsequent burning off and sintering. During the production of the catalyst support, the phase change materials can be filled into drilled-out hollow steel balls as a molten alloy, powder or granules. After the filling, the balls can be welded in an automatable process.

In an alternative embodiment, balls can be molded from the phase change material, which are coated with metal oxide layers of 50 µm to 5 mm by thermal spraying. The phase change material balls can be produced in various ways, for example by casting in molds, pressing of molded parts (precursors in the form of lengths of wire or rod) or forging of molded parts.

In a combined process, the support balls can be produced by forming from steel cylinders filled with phase change material and closed/welded on both sides.

Before the application of the active catalyst component, a coating layer of metal oxides, e.g. $SiO_2$, $Al_2O_3$ or $TiO_2$ can firstly be applied onto the surface of the balls by thermal spraying. The layer thickness can be 50 µm to 5 mm. Next, the ball can be coated with catalytically active material for example by wet impregnation. Before use, the ball can be further calcined in order to fix the catalytically active components on the surface.

The invention further relates to a recycle reactor comprising at least one reservoir for accommodating a chemical hydrogen storage substance, catalyst supports according to the first aspect of the invention, a screw conveyor for input and transport of the catalyst supports and rods for guiding and heating the catalyst supports during transport.

A similar ball recycle reactor (BRR) is already being used in other applications. The ball recycle reactor is a unit which was originally developed in another context for the fractionated thermal decomposition of plastic mixtures. The structure and mode of operation of the reactor are described in Hornung, A.: Entwicklung eines Verfahrens zur fraktionierten thermischen Zersetzung von Kunstoffgemischen [Development of a method for the fractionated thermal decomposition of plastic mixtures], Dissertation, Kaiserslautern, and in the German patent application DE 19620721. Reference is hereby made to the disclosure content of these two publications for the principle of such a ball recycle reactor. Use of such a reactor for performing heat-sensitive reactions is not previously known from the prior art.

In one embodiment of the recycle reactor according to the present invention, it is a ball recycle reactor. In a further embodiment of the recycle reactor according to the invention of the present invention, the screw conveyor is a ball screw conveyor. In a further embodiment of the recycle reactor according to the first aspect of the present invention, the catalyst supports are spherical catalyst supports according to the first aspect of the present invention.

In one embodiment of the recycle reactor according to the present invention, it is a ball recycle reactor comprising at least one reservoir for accommodating a chemical hydrogen storage substance, spherical catalyst supports according to one embodiment of the first aspect of the present invention, a ball screw conveyor for the input and transport of the spherical catalyst supports, and rods for guiding and heating the spherical catalyst supports during transport.

The recycle reactor according to the present invention comprises a reservoir for accommodating a chemical hydrogen storage substance. The chemical hydrogen storage substance is based according to one embodiment on N-ethylcarbazole and according to another embodiment on dibenzyltoluene. In one embodiment, the reservoir for accommodating the chemical hydrogen storage substance is not completely filled with the chemical hydrogen storage substance.

Furthermore, the ball recycle reactor comprises spherical catalyst supports as described above.

In addition, the recycle reactor comprises a screw conveyor for the input and transport of the catalyst supports. According to a further preferred embodiment, the screw conveyor is designed such that it draws in the catalyst supports which are surrounded by the liquid chemical hydrogen storage substance and transports them within or out from the liquid chemical hydrogen storage substance. According to a further embodiment, the screw conveyor is designed such that it transports the catalyst supports against gravity or vertically upwards within or out from the liquid chemical hydrogen storage substance.

By means of the built-in screw conveyor, in this reactor catalyst supports are conveyed against gravity or vertically upwards and thus conveyed in the circuit, as a result of which the reaction can take place in the thin film on the surface of the catalyst support. The catalyst supports are conveyed in a heating zone. The conveying of the catalyst supports can be effected in a guide which is heated only in the region above the liquid. The heating can according to one embodiment be effected by electrical resistance heating or inductively. The recycle reactor further comprises rods for guiding and heating the catalyst supports during the transport. These rods can be designed such that they inductively heat the catalyst supports during the transport. Further, a current-bearing coil which generates an alternating magnetic field can be provided in the rods of the recycle reactor. In this way, it is possible to heat the catalyst supports during the transport, in order to ensure an optimal reaction temperature on the catalyst present on the surface of the catalyst supports.

In some embodiments, in the recycle reactor according to the invention the hydrogen carrier material is conveyed in from the bottom and discharged approximately in the middle. The hydrogen formed can be taken off in the upper reactor region above the liquid level.

Such a reactor for performing a heat-sensitive reaction has considerable advantages compared to tubular reactors, such as for example a very stable temperature on the catalyst and thus high conversion rates, the possibility of continuous operation of the reactor, high energy efficiency through precisely accurate use of the energy for heating, flexible generated hydrogen production rates (e.g. for mobile applications, which exhibit major fluctuations in consumption) and the avoidance of hot spots on the catalytic layer and thus no thermal decomposition of the liquid hydrogen carrier materials, through utilization of the absorbed heat for the phase change.

According to the present invention, a method for the release of hydrogen from a chemical hydrogen storage substance is also claimed, comprising the heating of the catalyst supports described herein, the addition of the catalyst supports to a chemical hydrogen carrier and the catalytic dehydrogenation of the hydrogen storage substance.

In one embodiment, the method can also be operated cyclically, wherein the steps of the process are executed repeatedly. During this, the catalyst supports are left for a time in the chemical hydrogen carrier for the catalytic dehydrogenation of the hydrogen storage substance and then heated again, before they are again added to the chemical hydrogen carrier in order to catalytically dehydrogenate this.

The present invention also comprises the use of a catalyst support described herein for performing a heat-sensitive reaction. The particular properties of the catalyst supports described herein enable a very precise control of the heating of the catalyst supports and a finely graded release of the heat from the catalyst supports. Both can be precisely matched to the requirements of the particular use for a heat-sensitive reaction.

Furthermore, the present invention also comprises the use of a recycle reactor described herein for performing a heat-sensitive reaction.

The characteristics of the recycle reactor according to the present invention also enable very precise control of the heating of the catalyst supports and regulation of the optimal reaction conditions for the heat-sensitive reaction.

All embodiments of the present invention as herein described are regarded as combinable with one another in any way, insofar as those skilled in the art could regard such a combination as technically meaningful.

The invention is described in more detail below on the basis of the appended drawings, in which practical examples of a reactor according to the invention and the structure of a catalyst support are shown very schematically. Here all characteristics described, shown in the drawings and claimed in the patent claims taken for themselves and in any combination with one another constitute the subject of the invention, independently of their summarization in the patent claims and their back-reference and independently of their description or representation in the drawing.

Figure 1:
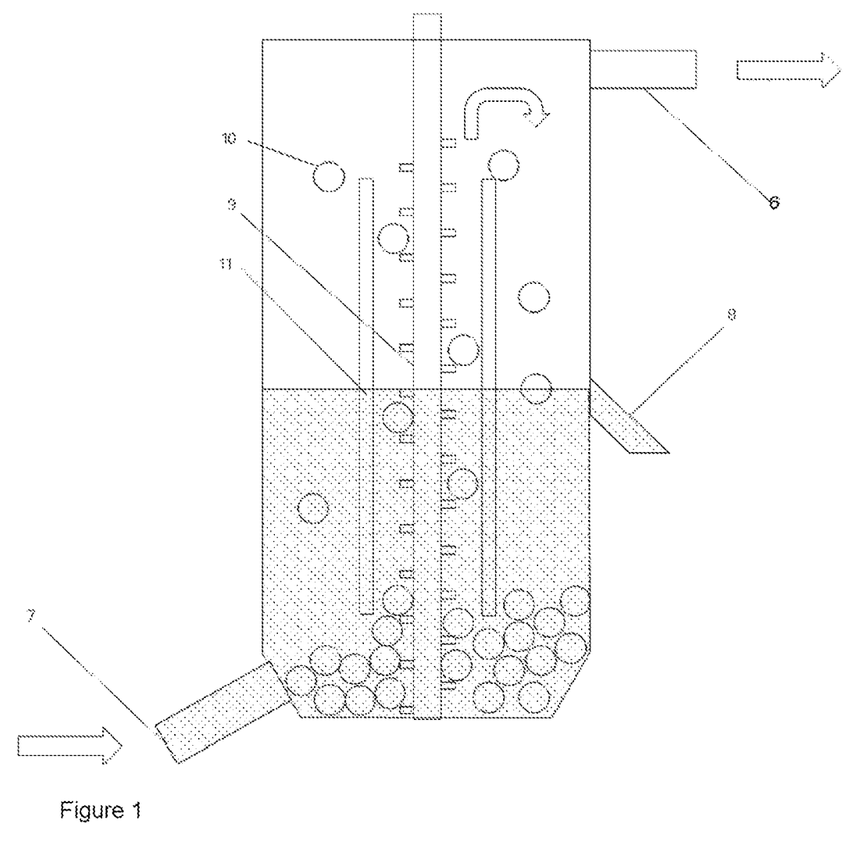
FIG. 1 shows a schematic side view of a reactor according to the invention according to one example.

FIG. 1 shows a schematic side view of a reactor according to the invention according to one practical example. In this, the following reference symbols stand for the corresponding parts of the diagram:
10 catalyst supports catalytically coated and filled with PCM
9 screw conveyor
11 guide rods for the heating
7 liquid hydrogen carrier material inlet
8 liquid hydrogen carrier material outlet
6 hydrogen outlet As is clear from this practical example, the catalyst supports 10 are conveyed vertically upwards and out of the liquid hydrogen carrier material in the duct between the screw conveyor 9 and the guide rods for the heating 11. In some embodiments, the catalyst supports 10 during the conveying are only heated beyond the middle of the guide rods 11, for example only above the level of the hydrogen carrier material within the reactor. In this practical example, the liquid hydrogen carrier material is pumped in at an inlet 7 in a lower region of the reactor. In this example, the liquid hydrogen carrier material can flow out of the reactor through an outlet 8 in a middle region. By means of this outlet 8, a uniform volume and a constant level of the liquid hydrogen carrier material can at all times be maintained within the reactor.

After being conveyed out from the liquid material, the catalyst supports 10 can now be heated and after conveying up to the highest point can again return into the liquid hydrogen carrier material under gravity. On the basis of the heating and the continuous release of the heat onto the surface of the catalyst supports 10, good reaction conditions are guaranteed over a long period. By suitable selection of the reactor size, the number of the catalyst supports 10, the intensity of the heating by the guide rods 11 and the conveying speed, optimal conditions and hydrogen yields can be achieved.

Figure 2:
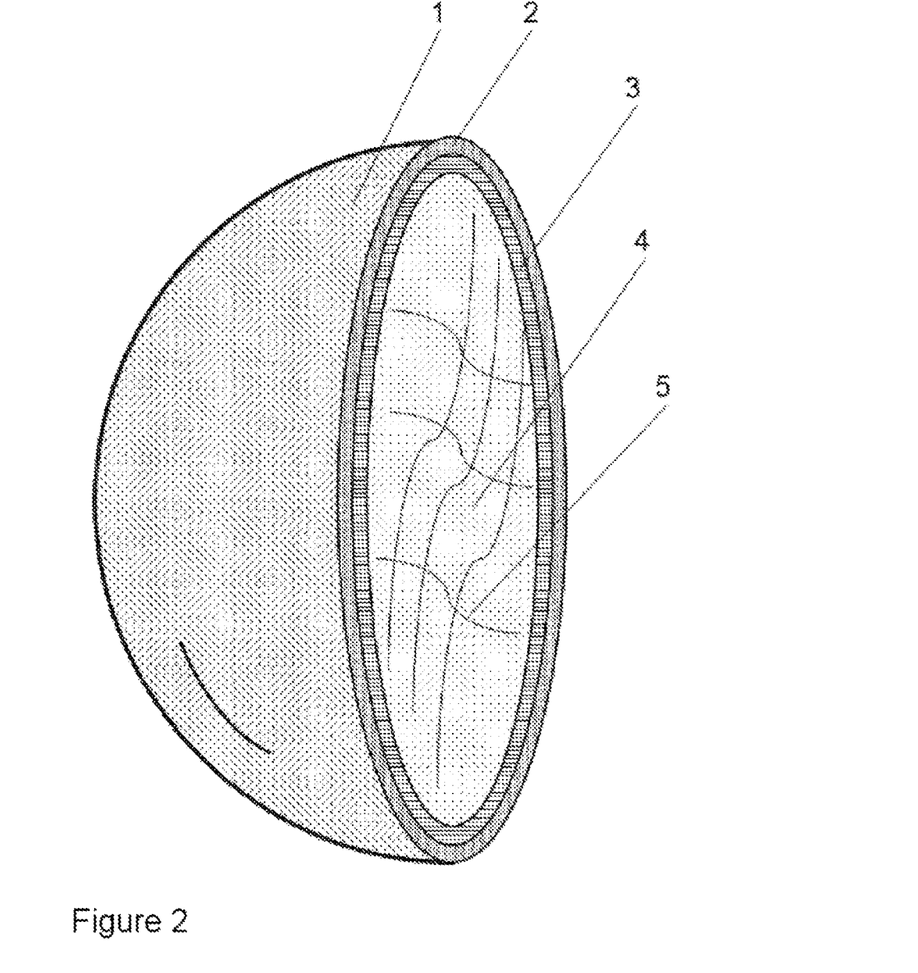
FIG. 2 shows a schematic section of a catalyst support according to the invention according to one example.

FIG. 2 shows a schematic section of a catalyst support according to the invention according to one practical example. In this, the following reference symbols stand for the corresponding parts of the diagram:
1 catalytically active surface
2 coating layer
3 supporting layer (optional)
4 core
5 electrically conducting structure (optional)

Figure 3:
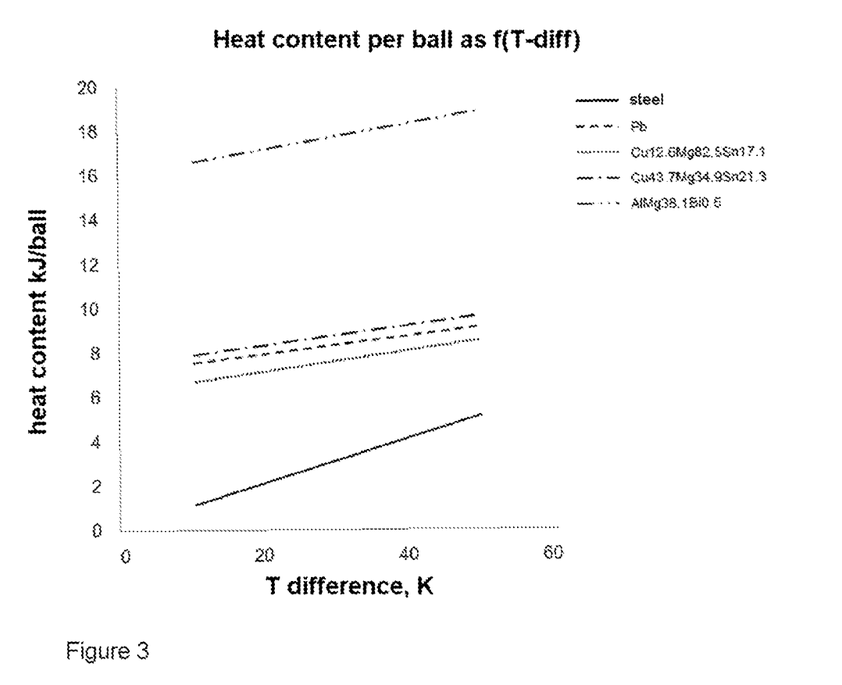
FIG. 3 shows a graph for comparison of heat content of balls made of various eutectics and of conventional steel balls at various temperatures.

FIG. 3 shows a graph for comparison of the heat content of balls made of various eutectics and of conventional steel balls at various temperatures. The results shown were obtained with balls of 3.7 cm diameter.

Practical Example

Production of the Catalyst Supports

For the production of the catalyst supports, firstly the desired temperature is established by selection of the phase change material (PCM). For the range around 230° C., the lead-free solder 95Sn5Sb is selected. The PCM material is into a supporting layer consisting of two hollow hemispheres of steel 1.4034 with an external diameter of 10 mm, which can be produced for example by sheet forming (pressing, forging, etc.).

During the production of the catalyst support, the PCM can be filled into the drilled-out hollow steel balls as a molten alloy. After the filling, the balls are welded in an automatable process. Firstly, before the application of the active catalyst component, a coating layer of $Al_2O_3$ is applied onto the surface of the ball by thermal spraying. The layer thickness is 50 μm. Next the ball is coated with catalytically active material (ca. 5 wt. % Pt) by wet impregnation. Before use, the balls are calcined in order to fix the catalytically active components on the surface.

Use in the Reactor

The catalyst supports described above are used in a ball recycle reactor according to FIG. 1 filled with dibenzyltoluene. By means of the built-in screw conveyor the balls are conveyed in the circuit and heated inductively above the liquid level, so that at the end of the heating path the whole PCM has just melted.

After this, the catalyst supports fall into the liquid. The solidification process of the PCM begins inside them at constant temperature, which is released to the coating and catalyst layer, smoothed via the supporting layer. Thus an ideal reaction temperature prevails on the catalyst layer over the whole descent of the balls. After arrival below, the catalyst support is again conveyed upwards via the screw conveyor and again heated above the liquid level. The hydrogen released is drawn off at the reactor cover. The dibenzyltoluene can optionally in batch mode and also flow through the reactor also continuously.

Of course, the invention is not limited to the embodiments presented. The present description is thus to be regarded not as limiting, but rather as illustrative. The following claims are to be understood such that a stated characteristic is present in at least one of the embodiments of the invention. This does not exclude the presence of further characteristics. Insofar as the claims and the above description define "first" and "second" characteristics or embodiments, this designation serves to distinguish between two similar characteristics or embodiments, without establishing a sequential order.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

The invention claimed is:

1. A catalyst support, comprising:
   an inner core, which includes at least one phase change material;
   a coating layer around the inner core, which includes at least one metal oxide;
   a catalytically active layer, which is positioned in interstices of the coating layer and/or lying on the coating layer, wherein at least one catalytically active substance is included in the catalytically active layer; and
   a supporting layer positioned under the coating layer, the supporting layer comprising a metal or an alloy, and the supporting layer encapsulating the at least one phase change material such that a hollow space remains within the supporting layer.

2. The catalyst support as claimed in claim 1, wherein the phase change material included in the inner core has a phase change temperature of less than about 500° C.

3. The catalyst support as claimed in claim 1, wherein the inner core further has an electrically conducting inner structure.

4. The catalyst support as claimed in claim 3, wherein the electrically conducting inner structure includes at least one sponge and/or a mesh and/or particles, which in each case are made of a metal or an alloy.

5. The catalyst support as claimed in claim 1, wherein the phase change material includes an inorganic salt or a metal alloy.

6. The catalyst support as claimed in claim 1, wherein the metal oxide included in the coating layer is electrically insulating.

7. The catalyst support as claimed in claim 1, wherein the catalytically active substance included in the catalytically active layer is a hydrogenation catalyst for a chemical hydrogen storage substance and/or the catalytically active substance included in the catalytically active layer includes a dehydrogenation catalyst for a chemical hydrogen storage substance.

8. The catalyst support as claimed in claim 1, wherein the catalyst support has a shape of a cylinder, a dumbbell, a ball or an ellipsoid.

9. The catalyst support as claimed in claim 8, wherein a spherical catalyst support has a diameter between about 1 cm and about 10 cm.

10. The catalyst support as claimed in claim 1, wherein the supporting layer includes a steel alloy.

11. The catalyst support as claimed in claim 1, wherein the coating layer has a thickness of about 10 μm to about 5 mm.

12. The catalyst support as claimed in claim 1, wherein the catalytically active layer is made as a partial coating.

13. The catalyst support as claimed in claim 1, wherein the coating layer covers between about 5% and about 25% of the surface of the catalyst support.

14. The catalyst support as claimed in claim 1, wherein the coating layer includes aluminum oxide and/or silicon oxide and/or titanium oxide.

15. The catalyst support as claimed in claim 1, wherein the surface is calcined.

16. The catalyst support as claimed in claim 1, wherein the supporting layer comprises a shell consisting of steel.

17. The catalyst support as claimed in claim 1, wherein the supporting layer is a rigid steel ball.

18. A recycle reactor, comprising:
   a reservoir for accommodating a chemical hydrogen storage substance;
   a catalyst support;
   a screw conveyor for input and transport of the catalyst support; and
   a heating device with which the catalyst support can be heated, wherein the catalyst support comprises:
     an inner core, which includes at least one phase change material;
     a coating layer around the inner core, which includes at least one metal oxide;
     a catalytically active layer, which is positioned in interstices of the coating layer and/or lying on the coating layer, wherein at least one catalytically active substance is included in the catalytically active layer; and
     a supporting layer positioned under the coating layer, the supporting layer comprising a metal or an alloy, and the supporting layer encapsulating the at least one phase change material such that a hollow space remains within the supporting layer.

19. The recycle reactor as claimed in claim 18, wherein the heating device comprises an inductive heating system.

* * * * *